H. WILSON.
MILK PAIL.
APPLICATION FILED AUG. 4, 1916.
1,218,147.
Patented Mar. 6, 1917.
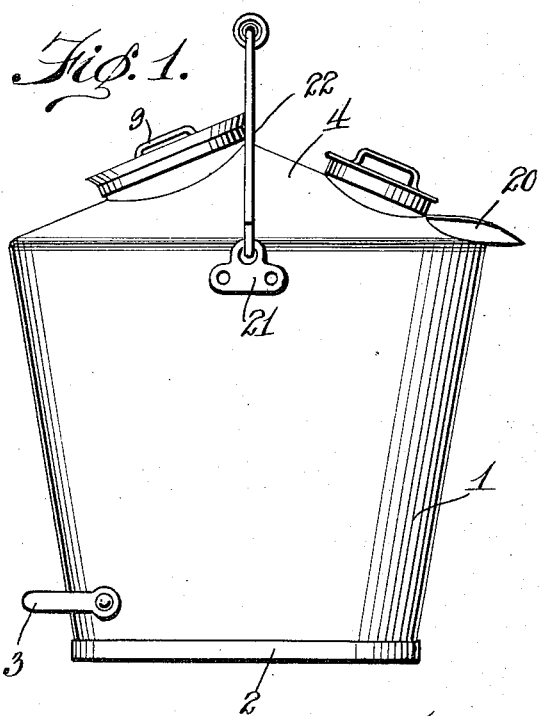
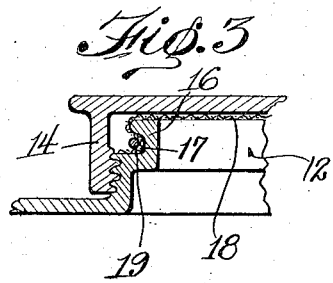
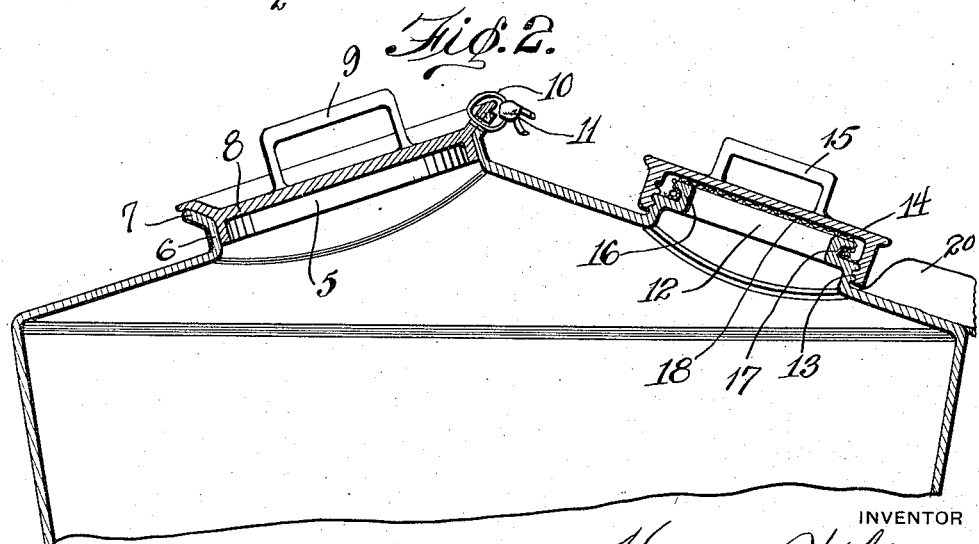
WITNESSES
Guy M. Spring
Wm H. Mulligan
INVENTOR
Henry Wilson
BY Richard Owen,
ATTORNEY

UNITED STATES PATENT OFFICE.

HENRY WILSON, OF MEADOWS, IDAHO.

MILK-PAIL.

1,218,147. Specification of Letters Patent. Patented Mar. 6, 1917.

Application filed August 4, 1916. Serial No. 113,132.

*To all whom it may concern:*

Be it known that I, HENRY WILSON, a citizen of the United States, residing at Meadows, in the county of Adams and State of Idaho, have invented certain new and useful Improvements in Milk-Pails, of which the following is a specification.

This invention relates to a milking pail and the primary object is to provide an improved pail for use particularly in a dairy and constructed so that the pail may be employed for shipping purposes after being used as a milking pail.

A further object of the invention is to provide a pail of this character that will be sanitary and provided with a strainer whereby the milk may be strained while it is being poured from the pail.

A further object of the invention resides in the provision of a pail constructed to prevent a minimum of waste if the pail should accidentally be upset.

A further object of this invention is the provision of a milking pail which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which;

Figure 1 is a side elevation showing a pail constructed in accordance with my invention.

Fig. 2 is an enlarged vertical section of the upper portion of the pail.

Fig. 3 is an enlarged detail fragmentary section of a portion of the strainer opening in the pail.

The body portion 1 of the pail is of the usual formation and is provided with a base flange 2 upon which the pail rests and a hand grip 3 is secured to the pail adjacent the bottom thereof for facilitating the pouring out of the contents of the pail. Integrally formed with the body portion 1 of the pail at the upper edge thereof is the conical top 4 which completely covers the top of the pail and thereby will effectively prevent the cow from accidentally placing its foot in the pail while the cow is being milked. At one side of the center of the conical portion 4 is an opening 5 which is provided with an upstanding flange 6 carrying an angularly disposed rim 7. This opening permits the pail to be filled and while large enough to permit the pail to be quickly filled it is, at the same time, of a diameter that will prevent too great a quantity of the contents of the pail from being lost if the pail should accidentally be upset. A cover 8 fits into the opening 5 and is provided with a handle 9 whereby the collar may be inserted or withdrawn from the opening 5.

When the pail is employed as a shipping can for sending either cream or milk from the dairy to the consumers it is often necessary to seal or secure the cover to the top of the pail for preventing malicious tampering with the contents. I, therefore, provide the cover and the lip 7 with apertures adapted to be brought into alinement, as shown by Fig. 2 of the drawing, for receiving a strand of wire 10 the ends of which may be tied together or sealed as at 11.

The conical top 4 is provided with another opening 12 through which the milk is poured when the contents is being dispensed. The edge of the opening 12 is provided with an annular flange 13 having exterior screw threads which receive the screw threads of a cap 14 having a handle 15. A flange 16 is formed above the annular flange 13 and is restricted in diameter so that it may be received within the cap 14 when the cap is arranged over the opening 12. An annular cover 17 is formed in the exterior of the flange 16 and a strainer for the opening 12 is provided by stretching a piece of foraminous material 18 over the opening 12 and around the exterior sides of the flange 16 after which a fastening wire or cord 19 is passed around the flange 16 and tightly secured in the cover 17 for holding the foraminous material tightly stretched across the opening 12. As shown more clearly by Fig. 3 of the drawing the foraminous material 18 may be easily removed for cleaning the same or for substituting a new piece of material to provide a new strainer. This is accomplished by moving the fastening wire or cord 19 from the cover 17. It will be observed that the cap 14 may be removed from the opening or replaced thereover without interfering with the strainer 18.

A spout 20 is formed at the edge of the conical top 4 and disposed in a position whereby it will receive the contents of the pail when the same is poured through the opening 12. Lugs 21 are secured to opposite sides of the body portion 1 of the pail and receive the ends of a carrying bail 22 which facilitates the lifting and carrying of the pail.

From the foregoing it will be observed that a very simple and durable milking pail has been provided, the details of which embody the preferred form. I desire it to be understood however, that slight changes in the minor details of construction may be made without departing from the spirit of the invention or the scope of the claims hereunto appended.

I claim:

1. The combination with a pail, of a conical top mounted on the top of the pail and provided with a large and a small opening, annular flanges formed around the rim of each of said openings, one of the said flanges being provided with exterior screw threads, a closure for the said opening, the said closure having a flange adapted to fit within the flange of the said opening, a closure for the other of said openings, a strainer element mounted in the said last mentioned opening, a spout formed on the edge of the said conical top and arranged to receive the contents of the said pail as it is ejected from the said last mentioned opening, the said strainer comprising a portion of foraminous material covering the said opening, and a fastening wire extended around the said flange and secured for holding the said foraminous material in stretched position.

2. The combination with a pail, of a conical top integrally formed with the pail and having its vertex disposed centrally above the center of the pail, the said conical top having a large and a small opening for providing an intake and a discharge opening, annular flanges formed around the rim of each of said openings, one of said flanges being provided with an exterior screw thread, a closure for the intake opening provided with a depending flange adapted to fit within the flange of the said intake opening, a closure for the discharge opening provided with interior screw threads for engaging the said screw threads on the flange of the discharge opening, a strainer element for said discharge opening and a spout formed at the edge of said conical top and disposed adjacent the said discharge opening.

In testimony whereof I affix my signature in presence of two witnesses.

HENRY WILSON.

Witnesses:
J. EDWIN THAMERT,
E. S. KIMBROUGH.

Copies of this patent may be obtained for five cents each, by addressing the "Commissioner of Patents, Washington, D. C."